350-286. XR 3539251 SR

Nov. 10, 1970     D. W. HUSTED ET AL     3,539,251

ROTATING PRISM SYSTEM

Filed Dec. 29, 1967     3 Sheets-Sheet 1

INVENTORS
DAVID W. HUSTED
JAMES A. HOLBROOK

BY Beaman & Beaman

ATTORNEYS

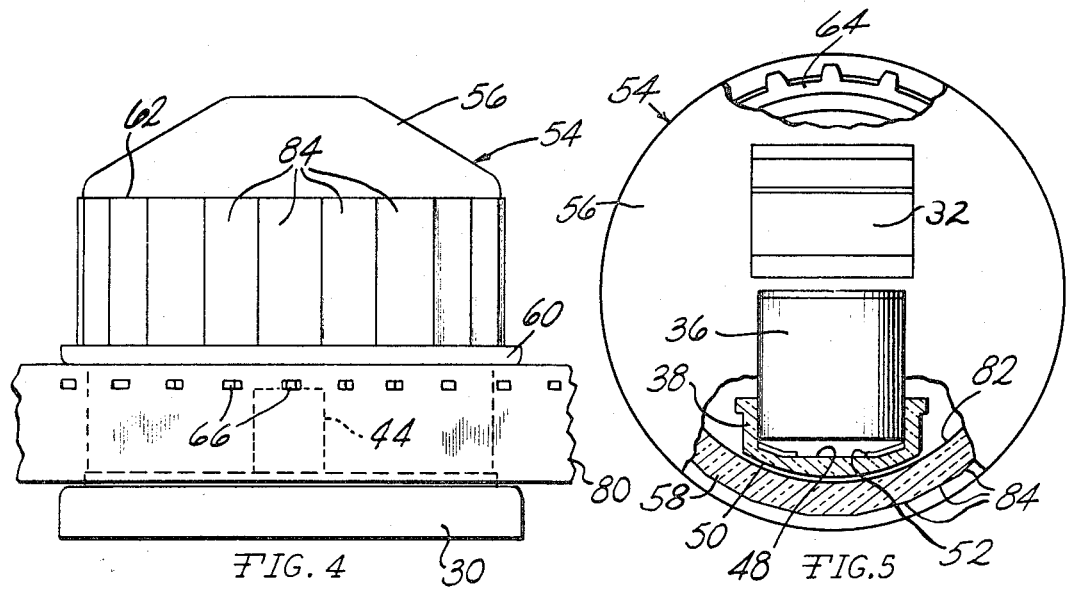
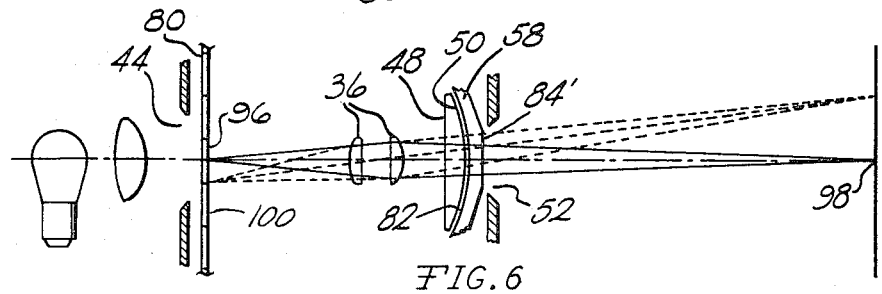
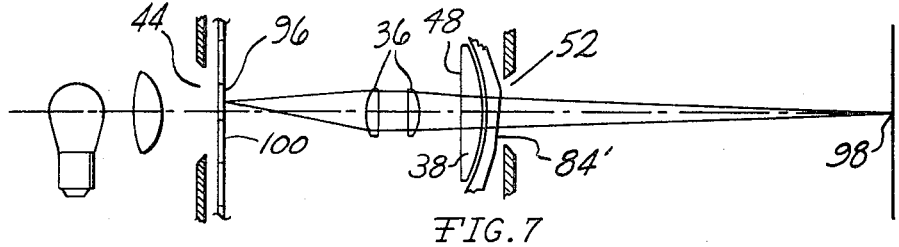
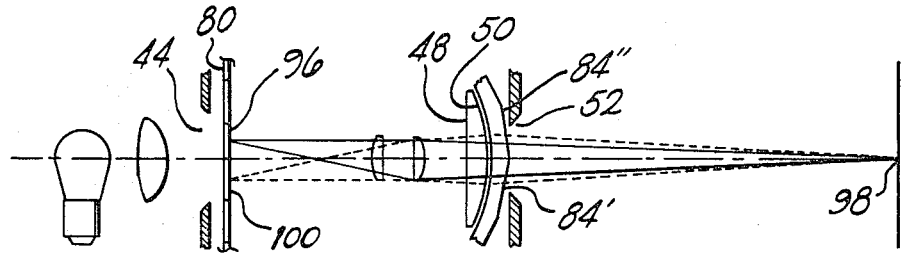

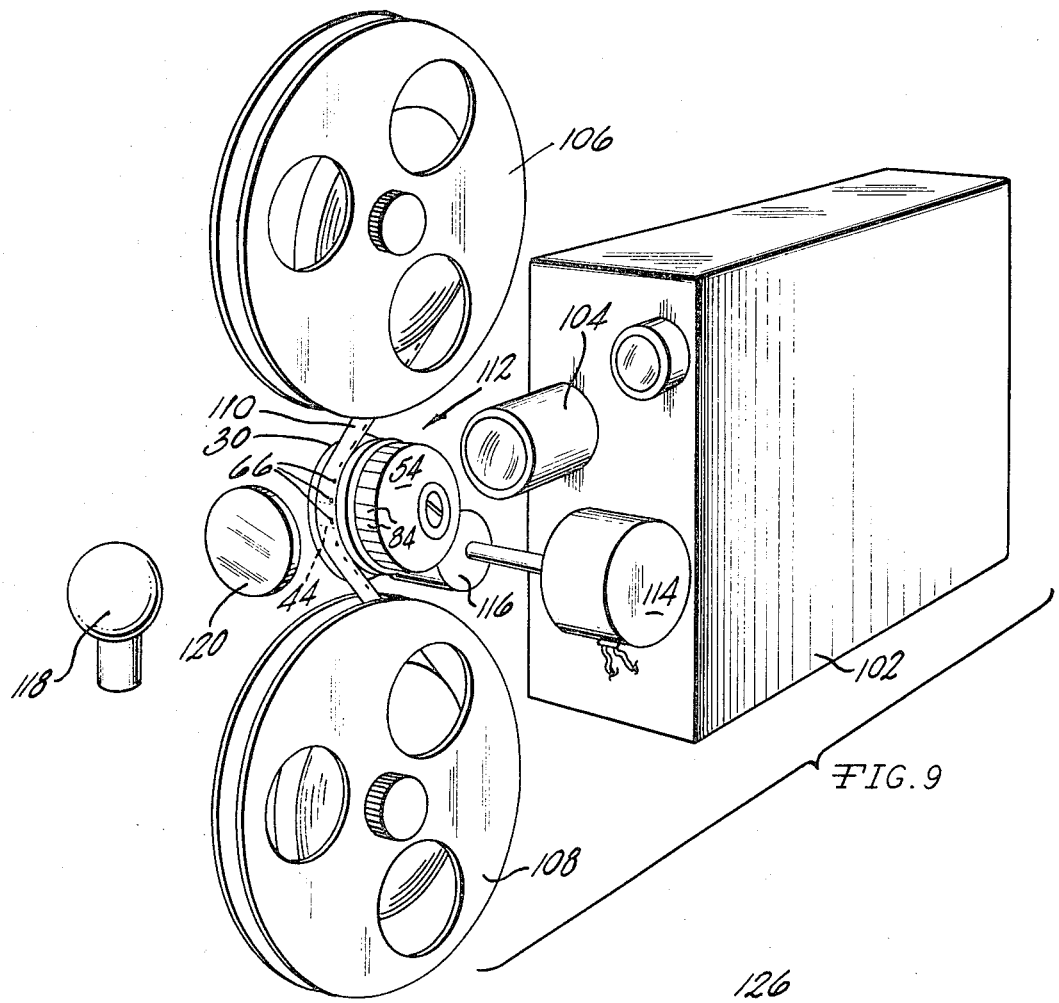
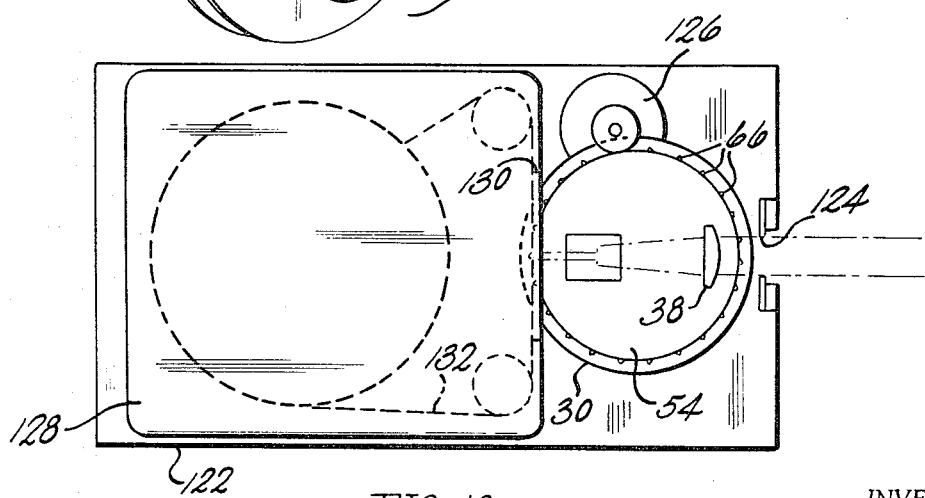

3,539,251
Patented Nov. 10, 1970

3,539,251
ROTATING PRISM SYSTEM
David W. Husted and James A. Holbrook, Ann Arbor,
Mich., assignors to Baia Corporation, Jackson, Mich.
Filed Dec. 29, 1967, Ser. No. 694,473
Int. Cl. G03b 41/04
U.S. Cl. 352—113   8 Claims

ABSTRACT OF THE DISCLOSURE

A rectifying prism system for a continuously moving motion picture film. The prism is a hollow cup-shaped member made of transparent synthetic plastic and is provided with one bearing surface about the periphery of the member and a second bearing surface near the axis of the member and at the opposite end from the first bearing surface. A lens is positioned inside the prism and mirrors direct the image from a continuously moving motion picture film through the lens and one side of the prism.

BACKGROUND OF THE INVENTION

The invention pertains to the field of motion picture rectification using a multiple faceted lens arrangement wherein prism surfaces are related in a generally cylindrical relationship for rotation about a common axis. The movie film movement being related to the rotation of the rectifier such that movement of a film image past a film aperture corresponds to rotation of the rectifier through an arc corresponding to the circumferential distance of a prism surface defined thereon.

The most common means for rectifying motion picture film is with the well known "shutter and pawl" structure. Such apparatus sequentially places film images within a film aperture and shutters the film aperture when shifting from one film image to the next. This type of apparatus requires relatively complicated operating mechanism, is noisy, and produces a "flicker" when the film is projected at relatively slow speeds past the film aperture. Additionally, in movie film having a sound track defined thereon it is necessary to use a "loop" in the film to permit the film to be continuously moved past the sound head pickup apparatus, in that the sound pickup must be continuous, even though the movement of the film past the film aperture is intermittant.

Image rectifiers for movie film are known wherein rectifying lens or prisms are mounted upon an element adapted to rotate about an axis. The lens or prism is substantially "cylindrically" related to the axis and the film image passes through the rectifier prisms as the rectifier continuously rotates at a uniform speed. Devices of this general type are shown in the U.S. Pats. 1,751,702; 1,991,957; 2,515,453; 2,554,892 and 2,972,280.

Image rectifiers for motion picture film of the so-called "continuous" type illustrated in the aforementioned patents have the advantage of being quiet, relatively simple in operation, and produce a continuous film movement which may be easily utilized with sound systems. However, the cylindrical or continuous film projection system has not heretofore become popular for several reasons. Difficulty has been encountered with this type of rectification system in producing a projected image of high quality. These problems largely are caused by difficulties in maintaining the characteristics of, and in producing prism surfaces of the proper optical characteristics. Perhaps the prime reason for the lack of commercial success and acceptance of the continuous type of rectification lies in the high cost of producing this type of rectifier which must include a number of light transmitting prisms or facets which, when using conventional manufacturing techniques, raise the cost of such equipment to be prohibitive for wide spread use.

SUMMARY OF THE INVENTION

The image rectifier in accord with the invention is of the continuous or cylindrical type wherein a plurality of prism facets rotate in a cylindrical manner about an axis. The light path through the rectifier is radial with respect to the axis of rotation and a film aperture is utilized in the light path. The rate of rotation of the rectifier is such that upon the film moving a distance relative to the film aperture equal to the distance of a film image, the rectifier rotates through an angle equal to the circumferential extent of a prism surface. The prisms defined upon the rectifier are of such configuration as to produce a stationary image upon the projection screen, for instance, and sufficient lens and light reflecting devices are utilized to permit practical application of the inventive concepts.

A basic contribution of the invention to the art lies in the forming of the rectifier portion through which light is transmitted of a molded material, preferably clear, transparent acrylic, which may be produced by high production mold injection apparatus. By forming the rectifier of a moldable, inexpensive material, it is possible to relate the prisms of the rectifier in an adjacent, optically correct manner without requiring expensive alignment, positioning, assembling or retaining means. The molded homogeneous construction of the rectifier substantially reduces cost with respect to previous constructions of similar devices, and permits this type of system to be used in low cost equipment, such as film viewers, editors, audio-visual devices, and inexpensive projectors and cameras.

The molded construction of the rectifier of the invention permits a large number of facets to be formed on a relatively small diameter rectifier and the large number of facets minimizes optical deviations.

Previous constructions of rotating prism rectifiers are seriously limited in the minimum $f$ number of their objectives. The molded construction of the invention permits an objective lens to be used as low as $f/1.5$.

In the practice of the invention the rotation of the rectifier is produced by a film sprocket fixed to the rectifier for rotation about the axis of the rectifier. The film moves through a film track adjacent the rectifier, and the sprocket extends into this film track. As the rotation of the rectifier is therefore directly produced by the film movement synchronization between the film and rectifier rotation can be very accurately maintained without requiring high precision drive mechanisms.

Additionally, the use of a move film rectifier in accord with the invention, in a projector, will produce a substantially constant illumination of the screen at all times which results in a high average light level with no sensation of "flicker" at slow film speeds. The continuous image presentation is particularly suitable for projecting motion picture film which is to be transmitted by television signals. Difficulty is encountered in the television presentation of movie film using conventional shutter and pawl apparatus in that such equipment usually exposes twenty-four frames of movie film per second, while television transmitting equipment requires thirty frames per second. This problem of synchronization to permit transmission of motion picture film over television is eliminated with apparatus of the disclosed type.

The continuous rotation of the rectifier permits the film to be continuously fed past a sound head, and the film may be driven by a friction drive capstan, which eliminates the noise and vibration associated with more conventional projecting equipment.

BRIEF DESCRIPTION OF THE DRAWINGS

The advantages and objects of the invention will be apparent from the following description and accompanying drawings wherein:

FIG. 4 is an enlarged, plan, detail view as taken from the top of FIG. 3, FIG. 5 is an elevational end view, partly sectioned as taken from the left of FIG. 3, FIGS. 6 through 8 are diagrammic, elevational, sectional views of components utilized in the concept of the invention illustrating the theory of projection when using a rectifier of the disclosed type, and FIGS. 9 and 10 are schematic views of a prism system in accord with the invention as used with television and movie cameras, respectively.

DESCRIPTION OF THE PREFERRED EMBODIMENT

The image rectifier system of the invention may be employed with a variety of photographic apparatus, such as cameras, projectors, viewers, editors or audio-visual devices. For purposes of illustration the structure and concepts of the invention are described in detail as used in conjunction with a movie film viewer or editor of the back lighted type.

Figure 1:
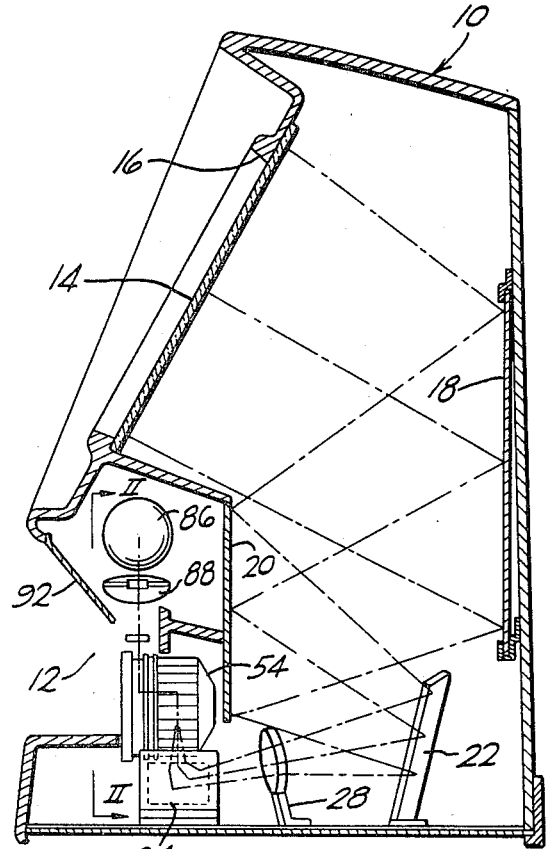
FIG. 1 is an elevational sectional view of projection apparatus employing the concept of the invention, the projection apparatus being in the form of a movie film viewer or editor.

With reference to FIG. 1 a movie film viewer is illustrated in elevational, sectional view and includes a frame 10, which may be formed of sheet material such as metal or plastic. The frame 10 defines a recess 12 at the front portion of the viewer in which the image rectifier, light ource and film track are located. A translucent viewing screen 14 is mounted upon the frame within an opening 16 and mirrors 18, 20, 22, 24 and 26 are mounted within the frame to provide a reflected projected image path for enlarging purposes. A field widening lens 28 may also be mounted within the frame intermediate the light path defined between mirrors 22 and 24.

A generally cylindrical support member 30 is mounted within the frame recess 12 upon the frame 10. The support member 30 is preferably formed of a molded synthetic plastic material. As will be apparent from FIG. 3, the support member 30 is substantially hollow and is provided with supporting surfaces for mirrors 32 and 34, objective lens 36 and a corrector lens 38, as will be later described. The upper exterior portion of the support member is recessed at 40 and provided with a cylindrical surface 42 which constitutes a film track concentric with the longitudinal axis of the support member. An aperture, henceforth designated the film aperture 44, is defined in the film track, and is of a circumferential length or arc of a dimension equated in a predetermined manner to the dimension of the film frame of the movie film which is to be employed with the apparatus. The support member 30 is provided with a passageway 46, FIG. 3, in alignment with the film aperture wherein light entering the film aperture may enter the interior of the support member.

Figure 3:
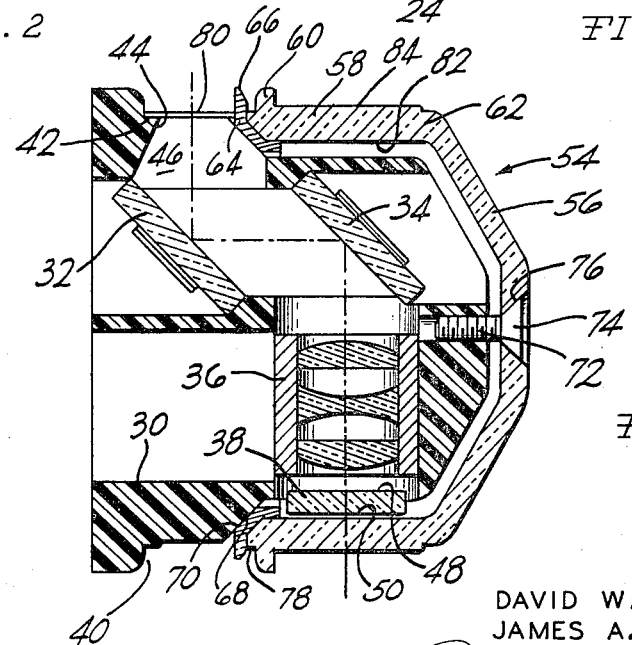
FIG. 3 is an enlarged, diametrical, sectional view through the structure immediately associated with the rectifier as used in the apparatus of FIG. 1.

Reflecting periscope mirrors 32 and 34 are mounted within the support member, FIG. 3, and an objective lens assembly 36 is also mounted within the support member in a radial manner and in axial alignment with the mirror 34. The support member is provided with suitable surfaces for mounting the mirrors 32 and 34, and the objective lens assembly 36. Additionally, a corrector lens 38 is mounted upon the lower end of the lens assembly 36 having a planar inner surface 48, FIG. 5, and an outer cylindrical segment surface 50. Preferably, the corrector lens 38 is masked to regulate the dimension of light passing therethrough. The mask upon the corrector lens defines a prism aperture 52 which is dimensionally related to the size of the prism surfaces as defined upon the image rectifier as will be described.

The image rectifier 54 is of a cup-shaped configuration including a radially extending hub portion 56 and a generally cylindrical peripheral portion 58. The peripheral portion 58 is axially defined by end edge portions 60 and 62, and the peripheral portion is integrally connected to the hub portion at the edge portion 62.

An annular film sprocket 64, which will usually be formed of metal, is affixed to the outer peripheral edge portion 60, FIG. 3, and includes an outer peripheral portion upon which film notch projections 66 are defined, FIG. 5. The film sprocket 64 also includes a conical inner surface 68, which corresponds in angular configuration to a conical surface 70 defined upon the support member 30. The sprocket surface 68 and the support member surface 70 constitute bearing surfaces for relating the peripheral portion 58 concentric to the axis of the support member.

A screw 72 is threaded into a threaded bore defined in the support member 30, and the screw includes a conical head having an under surface 74 which forms a bearing surface for cooperation with the conical surface 76 defined in the image rectifier hub portion. The axis of the screw is coincident with the axis of the support member, and the axis of rotation of the image rectifier. Thus, by means of the conical surface 68, 70, and 74–76 the image rectifier 54 is rotatably mounted upon the support member, and will be accurately related thereto during rotation.

The outermost peripheral edge portion 60 is formed with a cylindrical surface 78 which aligns with the support member film track 42, and the projections 66 extend radially beyond the film track whereby the notches of a movie film 80 received within the film track will cooperate with the sprocket projections and movement of the film through the film track will cause a direct rotation of the image rectifier.

In the disclosed embodiment, the inner surface 82 of the peripheral portion 58 is cylindrical, FIG. 5. The peripheral portion outer surface consists of a plurality of adjacent, identical planar prism surfaces or facets 84. The number of prism facets 84 defined upon the peripheral portion 58 corresponds to the number of sprocket projections 66. In this respect it is to be noted that with conventional movie film, such as 8 mm. film, a film notch is defined on the film for each frame or image.

The inner diameter of the peripheral portion surface 82 is only slightly greater than the diameter of the corrector lens surface 50 and, thus, a minimum air gap exists between the cylindrical corrector lens surface, and the inner peripheral portion surface. It will be noted that the rectifier peripheral portion 58 is in axial alignment with the mirror 34, objective lens 36, and the corrector lens 38.

The image rectifier 54 is formed of a synthetic, optically clear and transparent moldable material, such as acrylic material. In the disclosed embodiment, the hub portion 56 and the peripheral portion 58 are homogeneous and the entire image rectifier, except for the film sprocket, is formed in a single operation in an injection molding machine. By providing an image rectifier which can be formed by a molding operation, costs can be minimized, a very high degree of accuracy can be maintained between adjacent prism facets 84, and uniform and consistent optical characteristics are assured.

The light source for projection purposes consists of a lamp 86 mounted upon the frame 10, and a condenser lens 88 is associated therewith for directing concentrated light toward the film aperture 44. A filter or protecting lens 90 may be employed in the light path, and a shielding housing portion 92 is defined around the lamp. A pair of film guides 94, FIG. 2, are disposed adjacent the film track for maintaining the movie film within the film track 42 and rewind reels, not shown, may be used to lonitudinally move the film 80 over the film track.

Figure 2:
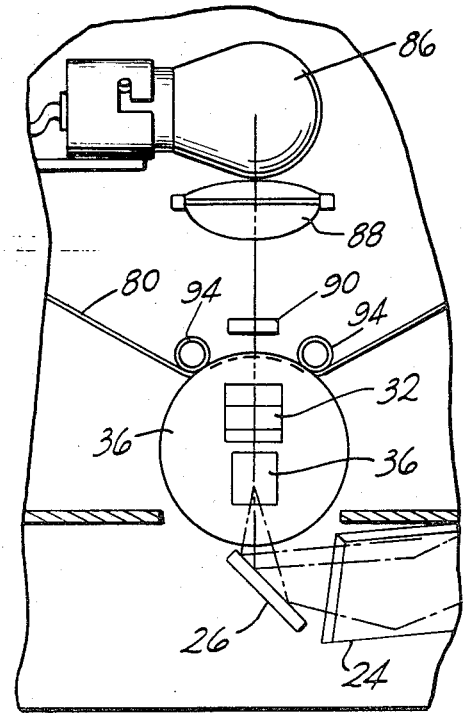
FIG. 2 is an enlarged, elevational, sectional view of the arrangement of the components shown in the apparatus of FIG. 1 as taken along section II—II thereof.

The light path is illustrated in FIGS. 1 through 3, and it will be appreciated that the light emitting from the lamp 86 and passing through the condenser lens 88, passes through film mounted upon the film track, and the film aperture 44 and is reflected on the mirror 32 to the mirror 34. The mirror 34 reflects the light through the objective lens 36 and the corrector lens 38, and then through the rectifier peripheral portion 58. The light leaving the rectifier is reflected from mirrors 26, 24, 22, 20 and 18 for enlarged projection upon the translucent screen 14.

As the film within the film track 42 rotates the rectifier 54 as the film is pulled along the film track, and as the sprocket projections 66 are related in a predetermined manner to the prism facets 84, a predetermined relationship between the film images and the prism facets 84 is maintained in a precise manner and, due to the direct driving of the rectifier by the film, synchronization problems are avoided.

The operation and theory of image rectification in accord with the apparatus of the invention will be appreciated from the schematic diagrams of FIGS. 6 through 8. In these figures components equivalent to those previously described are indicated by like reference numerals. It will be noted that, for purpose of illustration, the prism aperture 52 is shown as a separate component, and not as a masked portion of the corrector lens 38. Also, in these figures the periscope mirrors are not shown as these mirrors merely serve to shift the optical center line into the center of the prism surfaces.

FIG. 6 illustrates the prism facet 84' in a central position with respect to the prism aperture 52 wherein the facet 84' is parallel to the corrector lens surface 48 and the frame 96 of the film is centered in the film aperture 44. Two oblique rays from a point in the center of the film frame 96 are illustrated in full lines in FIG. 6 from the film to the stationary image represented at 98. Two field rays and the chief ray from an oblique point on the edge of the frame are illustrated in dotted lines. In this position the prism surface 84' acts as a plane parallel plate and has no effect other than a slight lengthening of the image distance, and the addition of a small amount of spherical aberration which may be corrected by the objective lens 36. The small air gap between the rectifier peripheral portion inner surface 82 and the corrector lens surface 50 has no effect on the image because the corrector lens is initially designed to compensate for the cylindrical power of the interior surface 82 of the peripheral portion.

FIG. 7 illustrates the relationship after the film has moved approximately one quarter of a frame from the centered position of FIG. 6. This movement of the film will produce a corresponding rotation of the rectifier 54 which produces an angular relationship between the prism surface 84' and the corrector lens planar surface 48. The field rays and the chief ray from the center of the frame 96 will assume a new light path as indicated by the full lines and, due to the relationship of the prism surface 84' to the corrector lens 38, the center of the film frame will continue to be projected to the center of the image plane 98. The chief ray makes substantially equal angles with the entrance and emergence side of the wedge prism produced by the surfaces 48 and 84' which results in a condition of minimum deviation. This is the optimum condition for linear deviation of the wedge prism produced with the angle of the prism surface 84'. As the angle of the prism surface 84' relative to the corrector lens 38 changes linearly with respect to film travel the image of the movie film will always be stationary at the image plane 98.

As the film travels further along the film track a condition such as indicated in FIG. 8 occurs wherein the edge of the film frame is centrally located within the film aperture 44 and equal amounts of light are simultaneously passing through two film frames. Under these conditions the light ray relationship will be as shown in the full and dotted lines of FIG. 8. The full lines represent the light path from the center of the frame 96 discussed with respect to FIGS. 6 and 7, and the dotted lines represent the light path from the center of the following film frame 100. As this relationship places the intersection of the adjacent prism surfaces 84' and 84" at the center of the prism aperture 52 the light passing through the center of the adjacent film frames will be projected at the common point upon the image plane 98 which gives constant illumination and projection of the film plane upon the image plane. As the film continues to move along the film track the cycle is repeated to produce a continuous, flickerless projection of the image.

In the schematics of FIGS. 6 through 8 a film aperture 44 is illustrated which is of a width in the direction of film travel equal to two frames of the film, and a prism aperture 52 is illustrated of a width equal to the circumferential length of one prism facet or surface 84. This condition will give constant illumination of the image upon the image plane. Another condition which will produce constant illumination is a film aperture one frame wide and a prism aperture which is two prism surfaces wide. Other film and prism aperture ratios between the aforementioned two extremes gives acceptable constant illumination, and may be varied to optimize the objective lens design.

By using a relatively large number of prism surfaces or facets 84 upon the rectifier peripheral portion outer surface, wherein a small angle exists between adjacent facets, the nonlinearity of the prism surfaces with respect to the corrector lens may be kept to an acceptable level.

In FIG. 9 a schematic representation is illustrated generally indicating one manner in which the prism system of the invention could be used to rectify movie film for television transmission. A conventional television camera is represented at 102 which includes the usual image tube, not shown, adapted to receive light through the lens 104. A supply film reel 106 is rotatably mounted adjacent the lens 104 and a film takeup reel 108 is rotatably mounted below reel 106. The movie film 110 passes from reel 106 to reel 108, and in the process of doing so, engages the film track of the prism system 112 which corresponds to the structure shown and described in FIG. 3, above. Of course, the support member 30 will be mounted upon a suitable bracket or mount, not shown, to maintain the system 112 in the illustrated relationship.

Rotation of the image rectifier wheel 54 may be produced by an electric motor 114 driving a friction wheel 116, or other type of transmission, which engages the wheel 54 and produces a constant speed rotation of rectifier 54. The notches in the film 110 engage projections 66 and, thus, the film will be pulled over the film track past the aperture 44. Drive means will be associated with reel 108 to rotate this reel to take up the film. Rather than driving the rectifier wheel 54, it is also possible to drive reels 106 and 108 in a regulated manner to produce rotation of the rectifier. Whether the rectifier wheel 54 drives the film, or is driven thereby, perfect synchronization between the film movement and image rectifier will be assured because of the direct connection of the rectifier with the film through film notch projections 66.

A light source 118 and a condenser lens 120 provide the illumination of the film frames as they pass the rectifier aperture and the image passing through the prism facets 84 is received by the television camera lens 104 and the aligned image tube.

Thus, upon the movement of the film past aperture 44 a continuous image is produced which is usable with television signal transmitting equipment, and the need for expensive conversion apparatus to render conventional movie film projection compatible with television transmission signal characteristics is eliminated.

The image rectifier of the invention may also be used to advantage in a motion picture camera environment, as schematically illustrated in FIG. 10. A camera case is shown at 122 having an exposure aperture which may include a diaphragm adjustment 124 through which the light of the desired image enters the case. The aperture adjustment 124 may be manual or automatic and permits light to enter the image rectifier wheel 54 through the prism facets thereof. The image rectifier system used is similar to that shown in FIG. 3 and the member 30 is mounted upon the case wall such that the prism facets are in alignment with the aperture adjustment 124. A motor 126, which is either electric or spring powered, may be mounted in the case 122 in driving connection with the rectifier wheel 54 for rotating the rectifier when the exposure is open.

A standard movie film cassette 128 of the removable double reel type may be inserted into the case 122 and the cassette includes an opening 130 which the film 132 passes by and through which the rectifier projections 66 may extend to engage the film and drive it past the rectifier aperture and the cassette opening. Of course, the film cassette opening 130 is in alignment with the rectifier film aperture whereby the light entering the rectifier wheel 54 through aperture adjustment 124 will be rectified and exposed to the frames upon the film 132.

The continuous rotary motion of the image rectifier system of the invention is quiet and smooth running and its use in the applications of FIGS. 9 and 10, as well as in the viewer of FIGS. 1 and 2, results in a simplified structure as compared to the more conventional pawl type film drive systems.

The aforedescribed apparatus results in a movie film image rectifier capable of producing high quality rectification, and the image rectifier described can be used with objective lenses as low as f/1.5. As the support member and all of the optical parts, including the rectifier, may be constructed of injection molded plastic, except the mirrors, manufacturing costs may be maintained at a minimum, and yet the direct drive of the rectifier will produce a very accurate synchronization between rotation of the rectifier and the film frames.

It is appreciated that various modifications to the inventive concept may be apparent to those skilled in the art without departing from the spirit and scope of the invention and it is intended that the invenion be defined only by the following claims.

What is claimed is:

1. A variable angle prism rectifier system adapted to rectify motion picture film by deviating the principal ray of the film image characterized by its low cost construction and ability to minimize abberations comprising, in combination, a homogeneous, integral, molded cup-shaped rectifier formed of synthetic plastic material having an axis of rotation and including a radially extending hub and a transparent axially extending peripheral portion concentrically depending from said hub and having an open end, means rotatably supporting said rectifier for rotation about its axis, said peripheral portion having an outer surface, a plurality of small, identical prism surfaces defined on said outer surface in adjacent relationship to each other, a cylindrical inner surface defined on said peripheral portion, a fixed corrector lens located within said peripheral portion having a cylindrical surface closely disposed adjacent said inner surface, a motion picture film aperture defined adjacent said peripheral portion open end and axially spaced therefrom for receiving a motion picture film, means within said rectifier defining a light path through said film aperture, corrector lens and peripheral portion, and film sprocket drive means mounted on said peripheral portion adjacent said open end thereof for engagement with a film within said film aperture.

2. In a variable angle prism rectifier system as in claim 1 wherein said means rotatably supporting said rectifier comprises a first bearing surface defined on said hub and a second bearing surface defined on said peripheral portion adjacent said open end.

3. A variable angle prism rectifier adapted to rectify motion picture film by deviating the principal ray of the film image characterized by its low cost construction and ability to minimize abberations comprising, in combination, a homogeneous, integral, molded, cup-shaped body formed of synthetic plastic material having an axis of rotation and including a radially extending hub and a transparent axially extending peripheral portion concentrically depending on said hub and having an open end, bearing means defined on said body concentric with said axis of rotation, said peripheral portion having an outer surface, a plurality of small, identical prism surfaces defined on said outer portion in adjacent relationship to each other, a cylindrical inner surface defined on said peripheral portion, and film sprocket drive means mounted on said peripheral portion adjacent said open end thereof for direct engagement with the motion picture film to be rectified.

4. In a variable angle prism rectifier as in claim 3 wherein said bearing means comprises a first bearing surface defined on said hub, and a second bearing surface defined on said peripheral portion adjacent said open end.

5. An image rectifier system for motion picture film comprising in combination, an outwardly extending cantilevered supporting member having a free outer end, a motion picture film track defined on said member having an aperture defined therein, an image rectifier rotatably mounted upon said member for rotation about an axis, a first bearing surface defined on said supporting member adjacent said film track and concentric to said axis, said rectifier being of a dished configuration and including an axial extending light transmitting peripheral portion of a generally circular configuration axially extending over a portion of said support member and concentric to said axis defined by an outer surface, an inner surface and axially spaced first and second edge portions, a radially extending rectifier hub portion depending from said first edge portion of said peripheral portion in a radial inward direction to close one end of said peripheral portion, central bearing means rotatably supporting said hub portion on said support member outer end, a plurality of identical prism surfaces defined on at least one of said rectifier peripheral portion surfaces, said prism surfaces being adjacent each other and evenly circumferentially spaced about the associated surface, said peripheral portion being of a one-piece molded construction formed of a synthetic plastic material, a second bearing surface defined on said rectifier adjacent said second edge portion concentric to said axis and cooperating with said first bearing surface, light refracting and reflecting means mounted on said supporting member forming a light path through said film track aperture and said rectifier peripheral portion, and a film sprocket mounted upon said image rectifier adjacent said second edge portion and concentric with the axis of rotation thereof operatively engaged by film within said film track.

6. An image rectifier system as in claim 5 wherein said film track is of a cylindrical segment configuration substantially concentric to said rectifier axis and disposed adjacent said second edge portion of said peripheral portion, said film sprocket extending into said film track, said reflecting means including a first mirror in axial alignment with said film track and a second mirror in axial alignment with said rectifier peripheral portion and in light reflecting relationship to said first mirror.

7. An image rectifier system as in claim 5 wherein said entire image rectifier is formed of an integral, molded, synthetic plastic material, said hub and peripheral portions thereof being homogeneous.

8. An image rectifier system as in claim 7 wherein said image rectifier is formed of optically clear acrylic material.

References Cited

UNITED STATES PATENTS 2,325,131  7/1943  Harrison _____ 352—119
2,543,463  2/1951  Malm.
2,817,995  12/1957  Kirkham _____ 352—117

FOREIGN PATENTS 620,580  3/1949  Great Britain.

JOHN M. HORAN, Primary Examiner

M. H. HAYES, Assistant Examiner

U.S. Cl. X.R.

352—105, 119; 350—6, 285, 286

UNITED STATES PATENT OFFICE
CERTIFICATE OF CORRECTION

Patent No. 3,539,251                     Dated November 10, 1970

Inventor(s) David W. Husted and James A. Holbrook

It is certified that error appears in the above-identified patent and that said Letters Patent are hereby corrected as shown below:

In column 8, line 20, delete "portion" and substitute --surface--

SIGNED AND
SEALED

FEB 23 1971

(SEAL)
Attest:

Edward M. Fletcher, Jr.
Attesting Officer

WILLIAM E. SCHUYLER, Jr
Commissioner of Patents

FORM PO-1050 (10-69)                                                  USCOMM-DC 60376